(12) United States Patent
Fang

(10) Patent No.: US 7,272,307 B2
(45) Date of Patent: Sep. 18, 2007

(54) VIRTUAL PROTECTION CHANNEL FOR FIBER OPTIC RING NETWORK

(75) Inventor: Rong C. Fang, Oak Hill, VA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 10/154,422

(22) Filed: May 23, 2002

(65) Prior Publication Data

US 2002/0191245 A1    Dec. 19, 2002

Related U.S. Application Data

(60) Provisional application No. 60/293,232, filed on May 25, 2001, provisional application No. 60/293,233, filed on May 25, 2001.

(51) Int. Cl.
*H04B 10/08* (2006.01)
*H04B 17/00* (2006.01)
*H04B 10/12* (2006.01)
*H04J 14/02* (2006.01)

(52) U.S. Cl. .................... 398/4; 398/5; 398/7; 398/23; 398/59

(58) Field of Classification Search ................ 359/110; 398/50, 7, 1, 4, 5, 2, 16, 34, 48, 15, 3, 41; 370/223, 222, 227, 228, 248; 714/4, 43; 375/257
See application file for complete search history.

(56) References Cited

U.S. PATENT DOCUMENTS

| | | | |
|---|---|---|---|
| 4,009,469 A * | 2/1977 | Boudreau et al. ........... 375/257 |
| 4,186,380 A * | 1/1980 | Edwin et al. .................. 714/4 |
| 5,235,599 A * | 8/1993 | Nishimura et al. ............ 714/4 |
| 5,341,364 A | 8/1994 | Marra et al. |
| 5,343,464 A | 8/1994 | Iino et al. |

(Continued)

FOREIGN PATENT DOCUMENTS

EP    920153 A2 *    6/1999

(Continued)

OTHER PUBLICATIONS

Karasan, E. and E. Goldstein. "Optical restoration at the wavelength-multiplex section level in WDM mesh networks." Photonics Technology Letters. vol. 10, No. 9, Sep. 1998: 1343-1345.*

(Continued)

*Primary Examiner*—Kenneth Vanderpuye
*Assistant Examiner*—David S Kim
(74) *Attorney, Agent, or Firm*—Welsh & Katz, Ltd.

(57) ABSTRACT

A single, normally inactive, protection ring, provides protection against a working channel failure in a fiber optic ring network. The protection channel is established and put into operation by a series of steps that are triggered by the detection of signal degradation or loss of light from one transponder by the other transponder. Each node reacts to a failure of another node in substantially the same way. Incoming traffic from external sources is rerouted from a working input-output interface to a protection interface, to establish a path for the protection signal. Signals are sent between nodes enabling the two nodes to resume communication. Only the portion of the protection ring between nodes is placed into service.

10 Claims, 10 Drawing Sheets

- A SINGLE OPTICAL CHANNEL IS ASSIGNED FOR THE WHOLE RING AS A PROTECTION CHANNEL
- WHEN THERE IS NO TRANSPONDER FAILURE, THE PROTECTION OPTICAL CHANNEL IS NOT USED OR ACTIVATED
- WHEN A TRANSPONDER FAILS, THE PROTECTION CHANNEL BETWEEN TWO END-NODES IS ACTIVATED FOR TRANSPORTING THE TRAFFIC

U.S. PATENT DOCUMENTS

| | | | |
|---|---|---|---|
| 5,365,510 A * | 11/1994 | Nicholson et al. | 370/222 |
| 5,442,623 A * | 8/1995 | Wu | 370/224 |
| 5,457,556 A * | 10/1995 | Shiragaki | 398/50 |
| 5,517,489 A | 5/1996 | Ogura | |
| 5,535,035 A * | 7/1996 | DeFoster et al. | 398/3 |
| 5,680,235 A | 10/1997 | Johansson | |
| 5,777,761 A * | 7/1998 | Fee | 398/7 |
| 5,867,289 A | 2/1999 | Gerstel et al. | |
| 5,956,168 A * | 9/1999 | Levinson et al. | 398/41 |
| 5,974,027 A | 10/1999 | Chapman | |
| 5,978,354 A | 11/1999 | Taketomi et al. | |
| 5,986,783 A | 11/1999 | Sharma et al. | |
| 6,009,076 A | 12/1999 | Takatsu et al. | |
| 6,038,044 A * | 3/2000 | Fee et al. | 398/56 |
| 6,046,833 A | 4/2000 | Sharma et al. | |
| 6,081,359 A * | 6/2000 | Takehana et al. | 398/1 |
| 6,088,141 A | 7/2000 | Merli et al. | |
| 6,097,516 A | 8/2000 | Almstrom | |
| 6,163,527 A | 12/2000 | Ester et al. | |
| 6,546,498 B1 * | 4/2003 | Saegusa | 714/4 |

FOREIGN PATENT DOCUMENTS

WO        WO9944317 A2 *  9/1999

OTHER PUBLICATIONS

Wu, Tsong-Ho. "Emerging technologies for fiber network survivability." IEEE Communications Magazine, vol. 33, No. 2, Feb. 1995: 58-59, 62-74.*

GR-1230-CORE, "SONET BLSR Equipment Generic Criteria." Bellcore, Issue 3. Dec. 1996; 3-1 to 3-24, 6-3, 6-15 to 6-20.*

Dimopoulos, C. "Dynamic performance evaluation in a WDM trunk and branch network incorporating 1:N wavelength protection." Optical Fiber Communication Conference, 2000, vol. 3, Mar. 7-10, 2000: 47-49.*

Uehara, D. et al. "Highly reliable and economical WDM ring with optical self-healing and 1:N wavelength protection." 11th International Conference on Integrated Optics and Optical Fibre Communications, and 23rd European Conference on Optical Communications (Conf. Publ. No. 448), vol. 4. Sep. 22-25, 1997: 65-68.*

Ramaswami, et al., Optical Networks: A Practical Perspective, 1998, pp. 434-451, Morgan Kaufmann Publishers, Inc., San Francisco, CA.

PCT Notification of Transmittal of the International Search Report or the Declaration, mailed Feb. 20, 2003 for PCT/US02/16542, counterpart of above-identified US application.

* cited by examiner

- THE NUMBER OF PROTECTION CHANNELS DEPEND ON THE NUMBER OF PROTECTED GROUPS (A GROUP MEANS LAMBDAS THAT HAVE THE SAME STARTING AND ENDING NODES), E.G. THREE PROTECTION CHANNELS ARE NEEDED ON THE RING AND 2 PROTECTION CHANNELS ARE NEEDED OVER SPAN A

- THE LAMBDA SELECTED FOR EACH PROTECTION CHANNEL IS DIFFERENT AND NEEDS TO BE MANAGED.

- A SINGLE OPTICAL CHANNEL IS ASSIGNED FOR THE WHOLE RING AS A PROTECTION CHANNEL

- WHEN THERE IS NO TRANSPONDER FAILURE, THE PROTECTION OPTICAL CHANNEL IS NOT USED OR ACTIVATED

- WHEN A TRANSPONDER FAILS, THE PROTECTION CHANNEL BETWEEN TWO END-NODES IS ACTIVATED FOR TRANSPORTING THE TRAFFIC

TRANSPONDER A FAILS AND A PROTECTION TRANSPONDER IS ACTIVATED TO GRAB THE VIRTUAL CHANNEL BETWEEN NODE A AND NODE C FOR TRANSPORTING TRAFFIC

TRANSPONDER B FAILS AND A PROTECTION TRANSPONDER IS ACTIVATED TO GRAB THE VIRTUAL CHANNEL BETWEEN NODE B AND NODE D FOR TRANSPORTING TRAFFIC

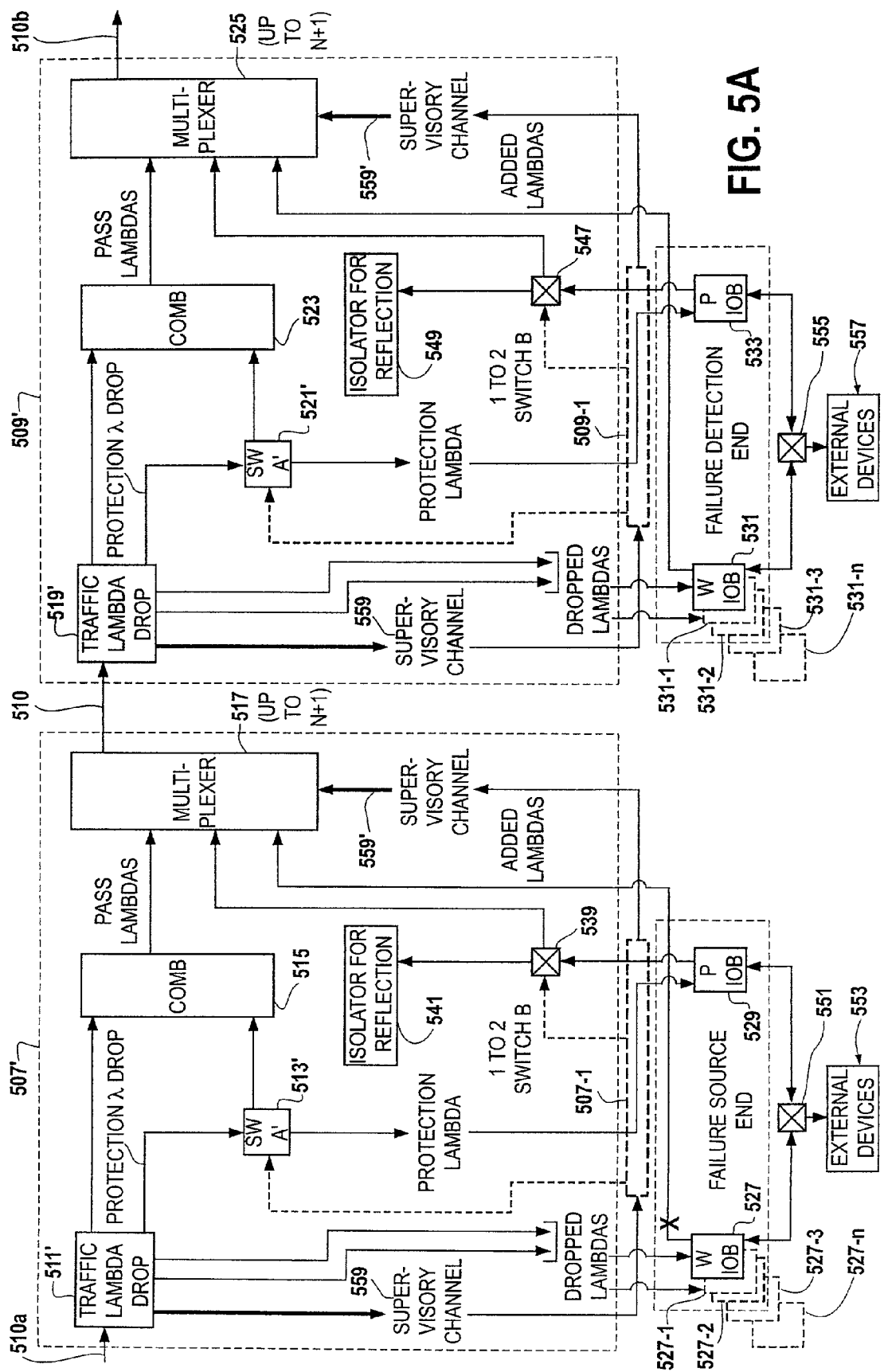

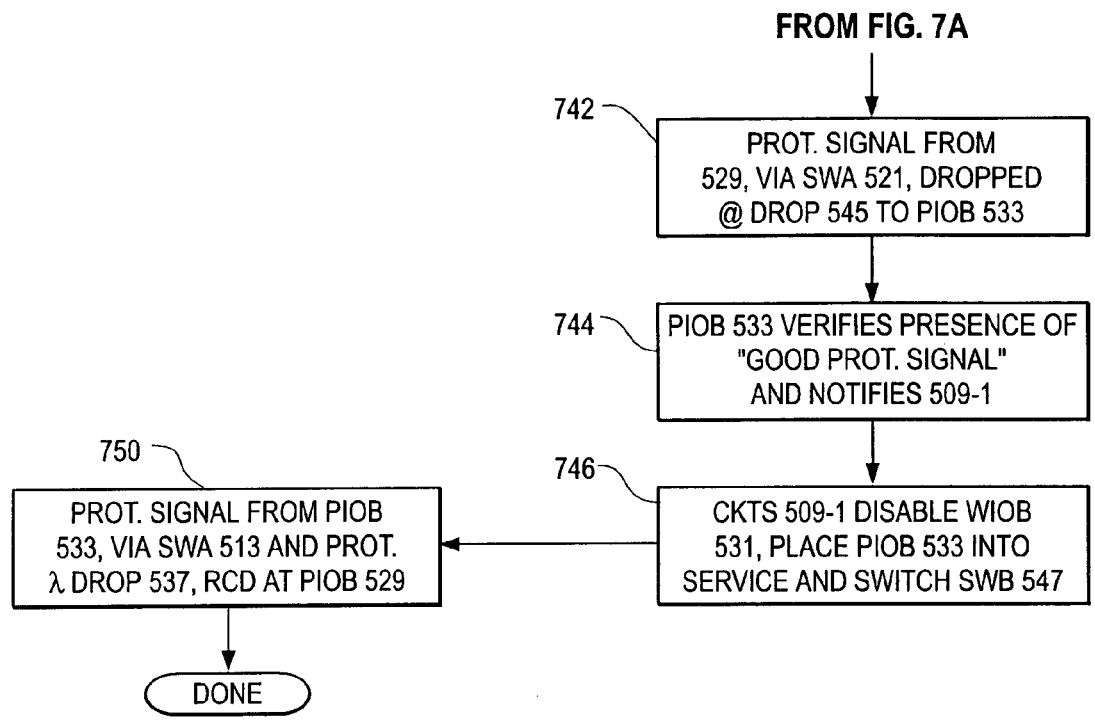
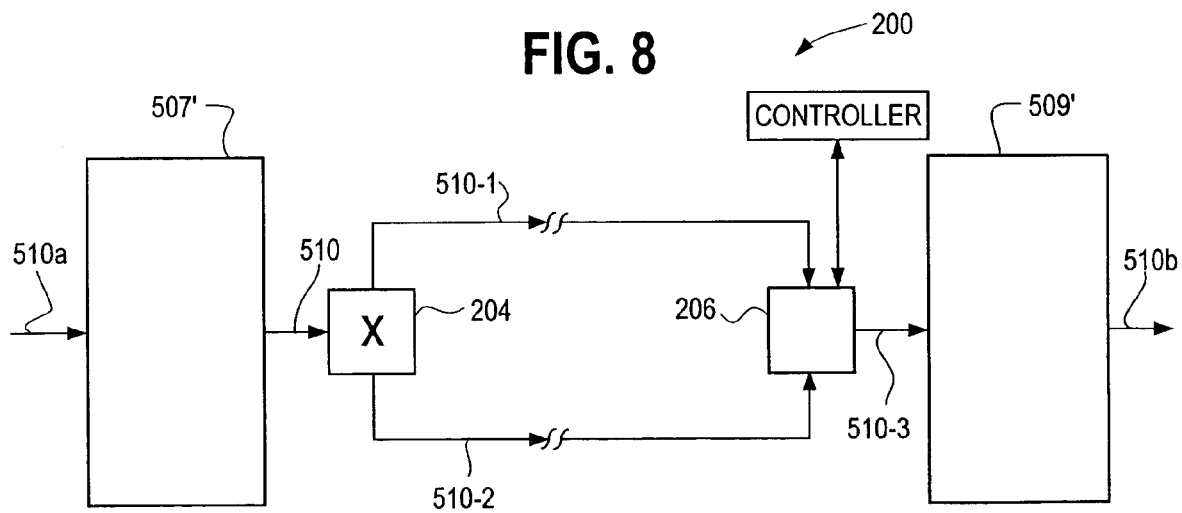

VIRTUAL PROTECTION CHANNEL FOR FIBER OPTIC RING NETWORK

The benefit of filing dates of Provisional Patent Applications Ser. No. 60/293,232, filed May 25, 2001 and Ser. No. 60/293,233, filed May 25, 2001 is hereby claimed.

FIELD OF THE INVENTION

The present invention relates to protection methods and circuits for multi-node fiber optic networks More particularly, the invention pertains to a fiber optic ring network that provides a single, normally inactive, optical protection channel for multiple optical communications channels.

BACKGROUND OF THE INVENTION

Fiber optic ring system design involves a balance between the need to provide protection for multiple channels of communication, the desire to maximize the bandwidth available for the communications function of the network, and the costs of constructing and maintaining the network. In a single-fiber ring where bandwidth considerations are secondary, a separate protection channel can be reserved for each communications channel. Such arrangements, while effective and readily implemented, often have unacceptable high overhead at the expense of revenue generating traffic.

In some systems, signals are sent in both the clockwise and the counterclockwise directions. The protection function takes advantage of the fact that a given signal can reach its destination via two distinct paths.

Many known wavelength division multiplexing (WDM) fiber optic transmission systems are deployed for communications between two end nodes. In this configuration, to protect against optical transponder failures, some systems use a one-by-one protection scheme.

In a one-by-one protection scheme, each working transponder has its own dedicated protection transponder. Some other systems use a one-by-N protection scheme, where one protection transponder serves to protect N working transponders. The same kind of protection schemes can be used in a ring configuration as are used for transporting multiple wavelengths, in the point-to-point configuration. As a result, in some known systems, required protection channels carried over a single fiber are equal to the number of two-node communications on the ring.

BRIEF DESCRIPTION OF THE DRAWINGS

FIG. 5A is a diagram of an alternate configuration to that of FIG. 5;

FIG. 8 is a block diagram illustrating an alternate embodiment of the invention.

DETAILED DESCRIPTION OF EMBODIMENTS

Figure 1:
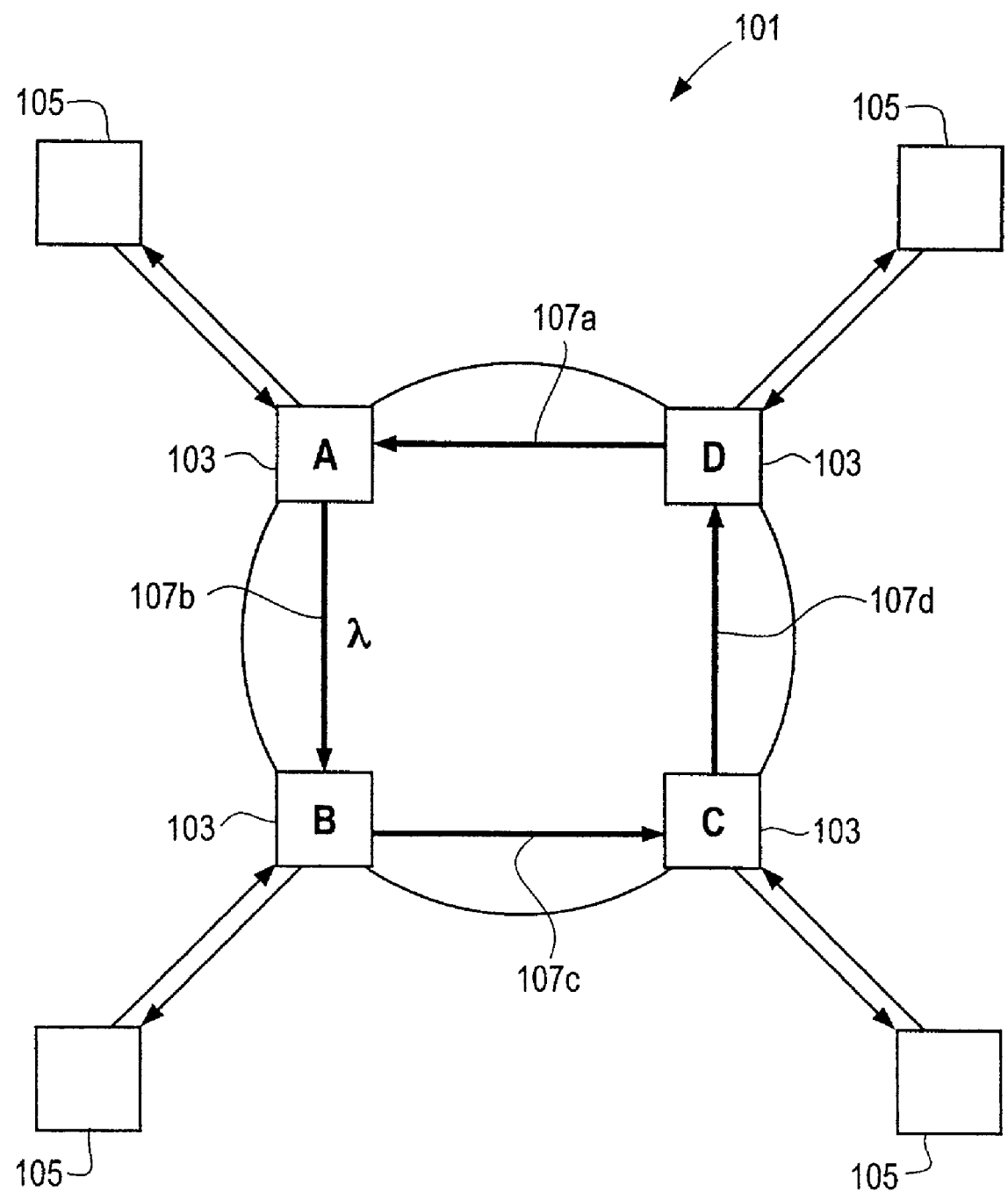
FIG. 1 is a diagram of a fiber optic ring communications network.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

The following describes a process, system and modules wherein an acceptable level of protection is provided, while maximizing the amount of bandwidth available for communications channels.

In the disclosed system, a single normally inactive protection channel provides protection against failures at a node. Such failures include, without limitation, malfunctioning or failure of one of the transponders at a node, degraded signals or unacceptable traffic bit error rates. The protection channel is established and put into service by a series of steps that are triggered by the failure detected at a receiving node.

A standardized transponder module is provided with functionality that enables a pair of identical transponder modules at spaced apart nodes to jointly respond to the failure by establishing the protection channel between the two nodes with a minimal loss of data. More specifically, each node reacts to a loss of light from another node or other detected failure in the same way: by rerouting incoming traffic from external sources from a working input-output interface ("IOB") to a protection IOB.

A plurality of switches establishes a path for the protection signal, by turning off a respective channel laser on the working IOB, and by sending a protection signal. The failure thus initiates a sequence of steps at the detecting node that culminates with the working IOB laser being turned off. This in turn, in one embodiment provides a loss of light signal at the failed node that initiates the sequence of steps that will complete the protection channel path between the two nodes. The two nodes can then resume communications.

As depicted in FIG. 1, a WDM-based fiber optic communications ring network 101 includes a plurality of nodes 103 (labeled A, B, C, and D) joined by fiber optic links 107a, b, c, d. Each node receives communications signals from external (upstream) communications devices 105 for transmission on the network, and receives communications signals through the links of the network for transmission to such communication devices.

The signals are transmitted through the fiber optic ring network as optical signals having different wavelengths, or "lambdas" using wave-division multiplexing (WDM). A given fiber optic cable is capable of simultaneously carrying a plurality of lambdas. As is known, voice or data, can be transmitted by modulating light transmitted at these respective wavelengths.

Communication between two nodes will usually occur via one or more channels, using one or more lambdas. A channel facilitates two-way communications between devices associated with two different nodes. Thus, for each channel, light for a predetermined wavelength, lambda, is transmitted between two nodes. When a signal is provided to a node by an external communications device, that signal is then used to modulate the beam for transmission between the two nodes.

Figure 2:
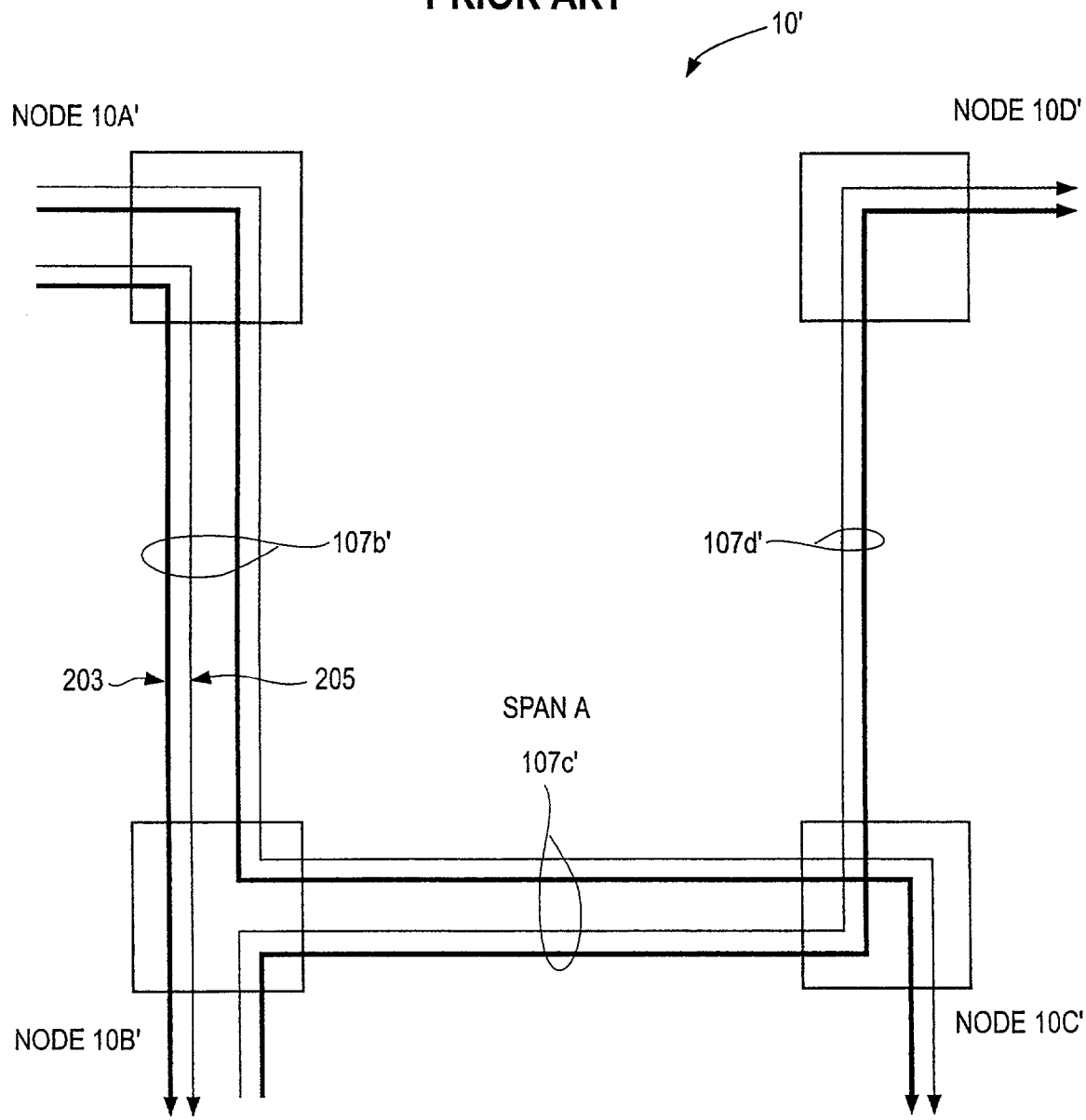
FIG. 2 is a diagram illustrating a prior art protection system for a fiber optic ring communications network.

A known prior art system 10' is illustrated in FIG. 2. In system 10', pairs of nodes are connected by a fiber, such as fibers 107*b'*, *c'*, *d'*, which carries communications channels 203 as well as protection channel 205. Accordingly, each communication lambda has a protection lambda associated with it. The protection lambda will be used to carry the respective communications in the event of a failure of the respective communication channel.

The number of protection channels in the prior art example of FIG. 2 depends, at least in part, on the number of groups of channels which have the same starting and ending nodes, such as 10A', B'; 10A', C' and 10B', D'. For example, at least three protection channels of different wavelength would be needed in the configuration of FIG. 2.

Figure 3:
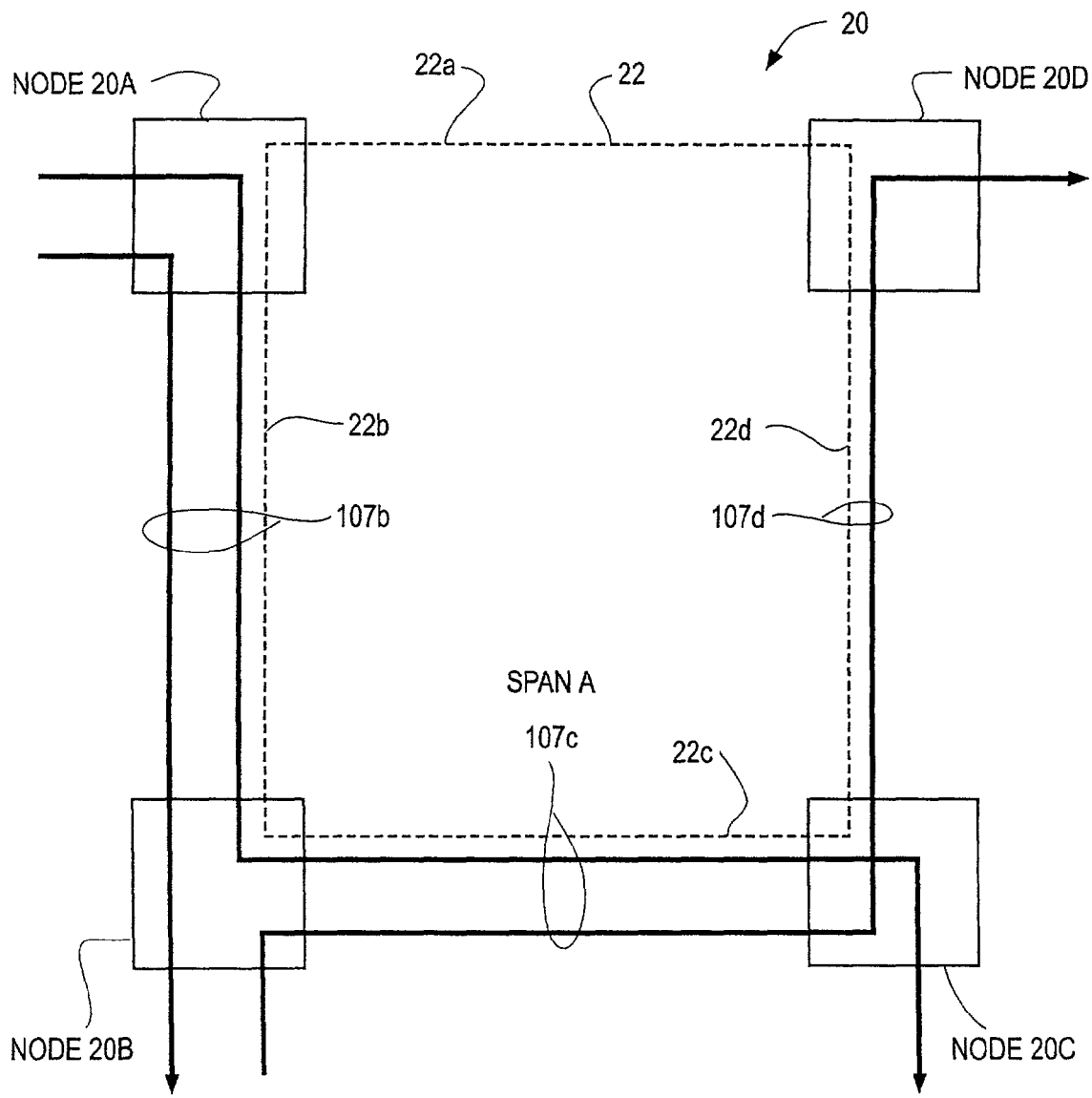
FIG. 3 is a diagram illustrating a fiber optic ring communications network protection system for the network of FIG. 1.

FIG. 3 illustrates a portion of the system 20 which incorporates the protection system of the current invention. In system 20, only one wavelength, a single protection channel, serves as protection for all existing channel.

As illustrated in FIG. 3 a single optical channel 22 is assigned as a protection channel for the entire ring, including nodes 20A, B. C, D. So long as there are no failures, for example so long as all of the system transponders (for example, light producing lasers) function properly the protection channel is not activated. When a transponder fails, for example at node 20C, the protection channel 22 would be activated to restore traffic transport between nodes 20C, D. Other failures would also cause the protection channel to be placed into service.

In the protection scheme of FIG. 3, only one channel need be dedicated for a protection function per optical add/drop multiplexed (ADM) ring. Span "A", link 22C. Illustrated in FIG. 3 requires only one protection channel, not two as in FIG. 2. Additionally, the scheme of FIG. 3 does away with a need to manage multiple protection channels as in FIG. 2.

Figure 4:
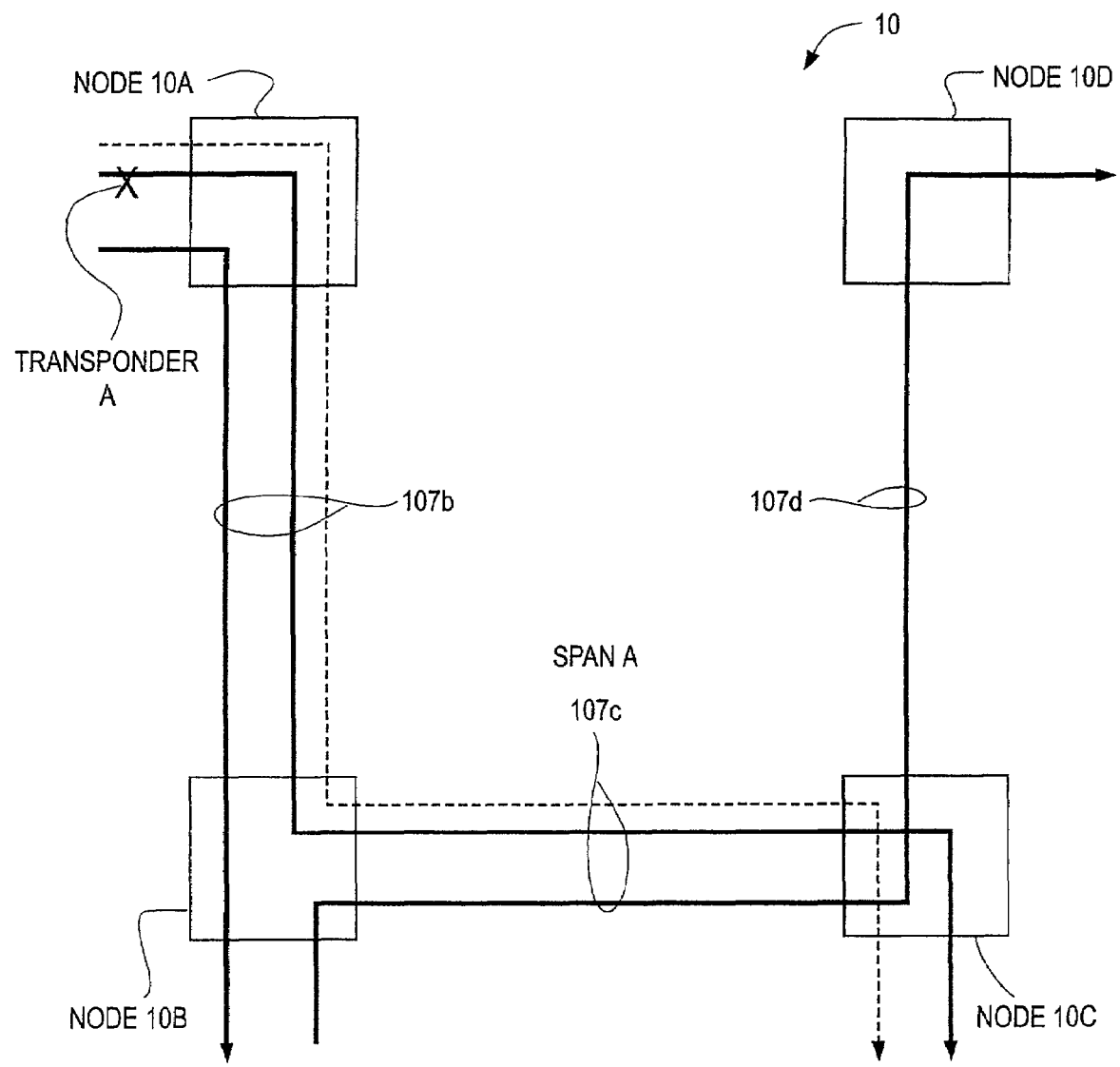
FIG. 4 is a block diagram of exemplary establishment of a protection channel in a fiber optic ring network according to an embodiment of the current invention.

FIG. 4 illustrates an exemplary failure, a transponder failure at node 20A, relating to a given channel at that node of system 20. A series of steps is then initiated that result in the protection channel being automatically established between two nodes such as 20A, C that have experienced a breakdown of a primary communications channel.

It will be understood that the invention is not limited to recovering from a transponder failure. It can advantageously respond for example to a degraded signal or erroneous bit rates.

Structures and methods disclosed herein, as will be understood by those of skill in the art, are especially advantageous in that only one protection ring and one protection transponder per node are necessary:

1) irrespective of the number of nodes;
2) irrespective of the number of working channels; and
3) irrespective of the destination nodes of the signals being carried by the working channels.

In addition, only one protection detector/transponder interface (PIOB) is required per node irrespective of the number of working pass-through channels and the number of detector/transponder add/drop interfaces (WIOBS) at any node.

Figure 4A:
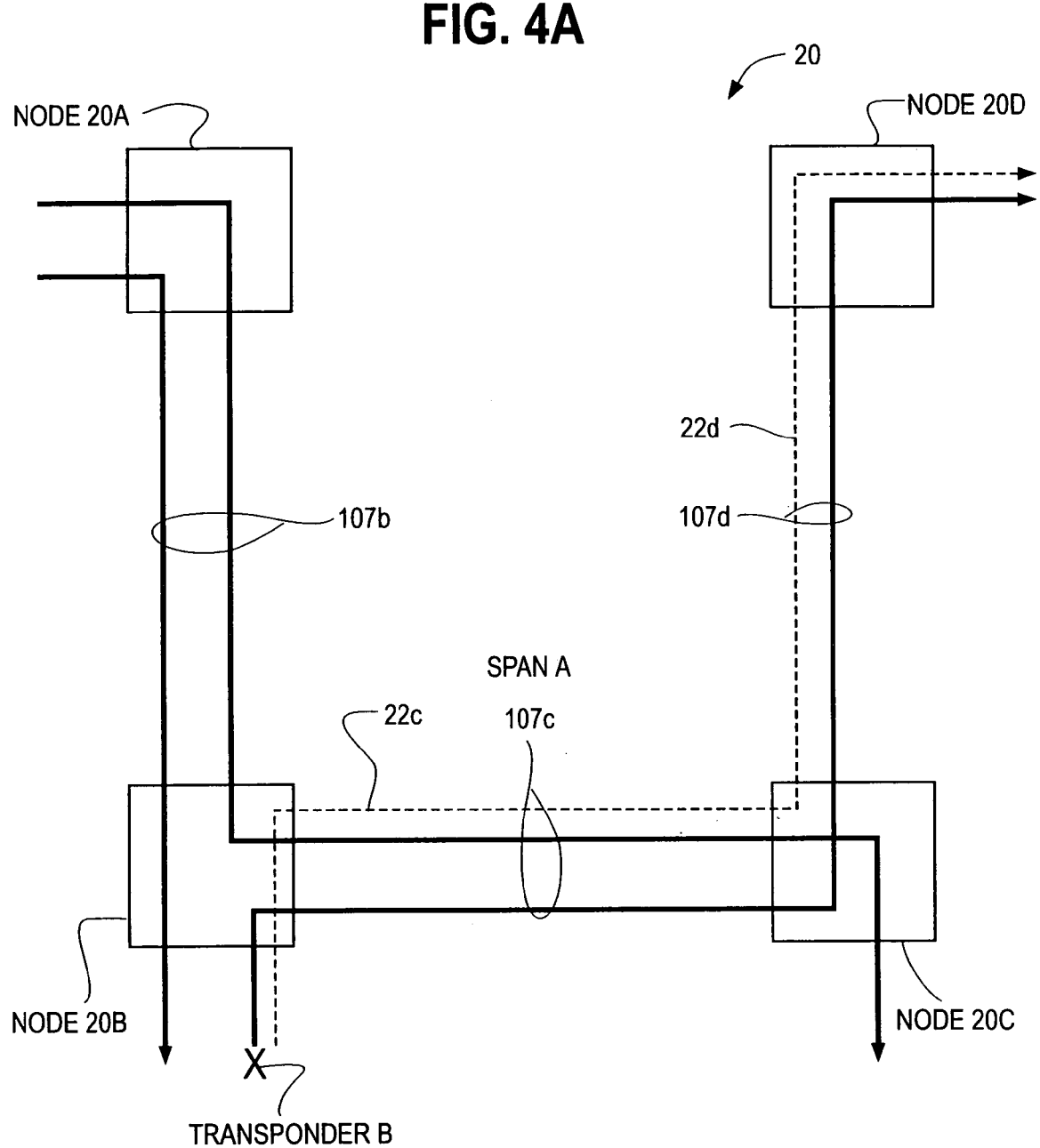
FIG. 4A is a block diagram illustrating another example of establishing of a protection channel in a fiber optic ring network according to an embodiment of the current invention.

FIG. 4A illustrates an exemplary failure at node 20B. The protection channel members 22*c, d* are activated between nodes 20B, D to carry traffic.

Figure 5:
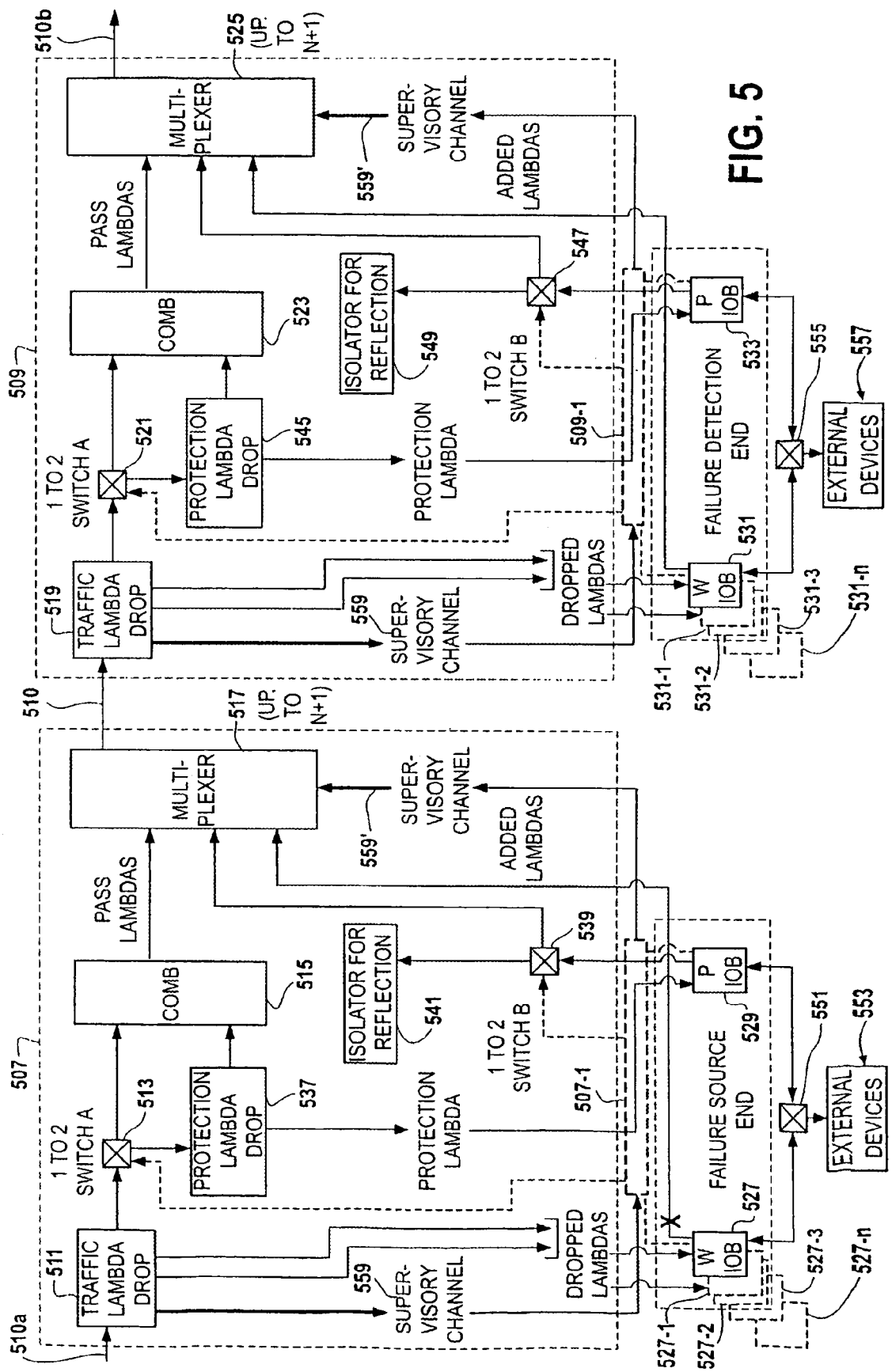
FIG. 5 is a diagram illustrating paths of communication between two nodes of the ring network of FIG. 1.

FIG. 5 provides a more detailed view of a pair of nodes 507, 509, for example in system 10. The two nodes are in communication with each other, via optical link 510, part of a fiber optic ring network 10 that embodies the present invention. Nodes 507, 509 are substantially identical and contain one or more working input-output interfaces ("WIOBs") 527, 527-1 . . . 527-n and 531, 531-1 . . . 531-n and a protection input-output interface ("PIOB") 529 and 533 as the interfaces between the communications network and the external communications devices.

Each node 507, 509 includes control circuits 507-1, 509-1. These circuits interact with other node components as discussed subsequently. Circuits 507-1 and 590-1 receive the respective incoming supervisory channel, such as 559, and transmit on the outgoing supervisory channel 559'.

A WIOB for any given node includes a receiver or detector of a received lambda, and, a transponder such as a laser for generating a signal corresponding to the wavelength of light representing a given channel. In the depicted embodiment, each node has a plurality of WIOBs and one PIOB, each having one laser. Each WIOB and PIOB is associated with a specific channel.

The lasers though modulated operate substantially continuously, during selected time intervals so that—absent any failure—nodes in communication with each other over a channel receive signals substantially continuously from each other. When a transponder at a given node fails and stops sending its signal, the channel between two nodes no longer can carry traffic. Alternately, other types of failures also disrupt traffic.

To continue carrying traffic, a channel for a protection signal must be immediately enabled and placed in service. The current invention accomplishes this with circuitry to carry out a sequence of steps at a given node upon detection of a failure, for example, loss of light from a node with which it is communicating. Two nodes that have experienced a breakdown communication between them can rapidly reestablish communication by activating the respective protection channel.

In normal operation, a signal 510*a* from another node enters node 507 at traffic lambda drop 511. If node 507 is the receiving node for the communication on the signal, the traffic lambda drop 511 passes the signal to the appropriate Working Input/Output Interface (WIOB) 527. This interface performs an opto/electric conversion and sends the signal out of the network toward its final destination, via switch 551 to a communications device 553 external to the ring network.

If node 507 is not the receiving node for the signal, the traffic lambda drop 511 couples the signal through Switch A to combiner 515. Combiner 515 couples the signal to multiplexer 517, which then couples a composite signal, via link 510 onto node 509.

If node 509 is the final in-network destination of the signal, the signal is dropped at traffic lambda drop 519, coupled to respective WIOB 531. The signal is converted and sent via switch 555 along to device 557 outside the network.

If the signal is destined for a different node, node 509 couples it along in the same manner that node 507 coupled it along, and so forth, until it reaches its destination. Processes and circuitry for implementing the functionality described above, such as causing signals to be dropped at particular nodes (as illustrated by traffic lambda drops 511 and 519) are well known to those with ordinary skill in the art and need not be described further.

In one embodiment of the invention, normal communication between nodes 507 and 509 occurs as follows. Signals originating at an external communication device, such as device 553, associated with node 507 travel through switch 551 to WIOB 527 through multiplexer 517 and on to node 509. Where node 509 is the receiving node for the signal, the the signal is routed through WIOB 531, via switch 555 to external communication device 557.

In the unidirectional system described herein, signals to be added from device 557 travel through switch 555 and are transmitted by WIOB 531, through multiplexer 525, through any intervening nodes, then on to node 507. At node 507, the signals to be dropped go through traffic lambda drop 511, through WIOB 527, and on to external communication device 553. Thus, communication is established between external communication devices 553 and 557, with the communications signals flowing in the same direction around the fiber optic ring network. In normal operation, the protection channel carries no optical signal, and thus no protection signal is present in the network.

Figure 6:
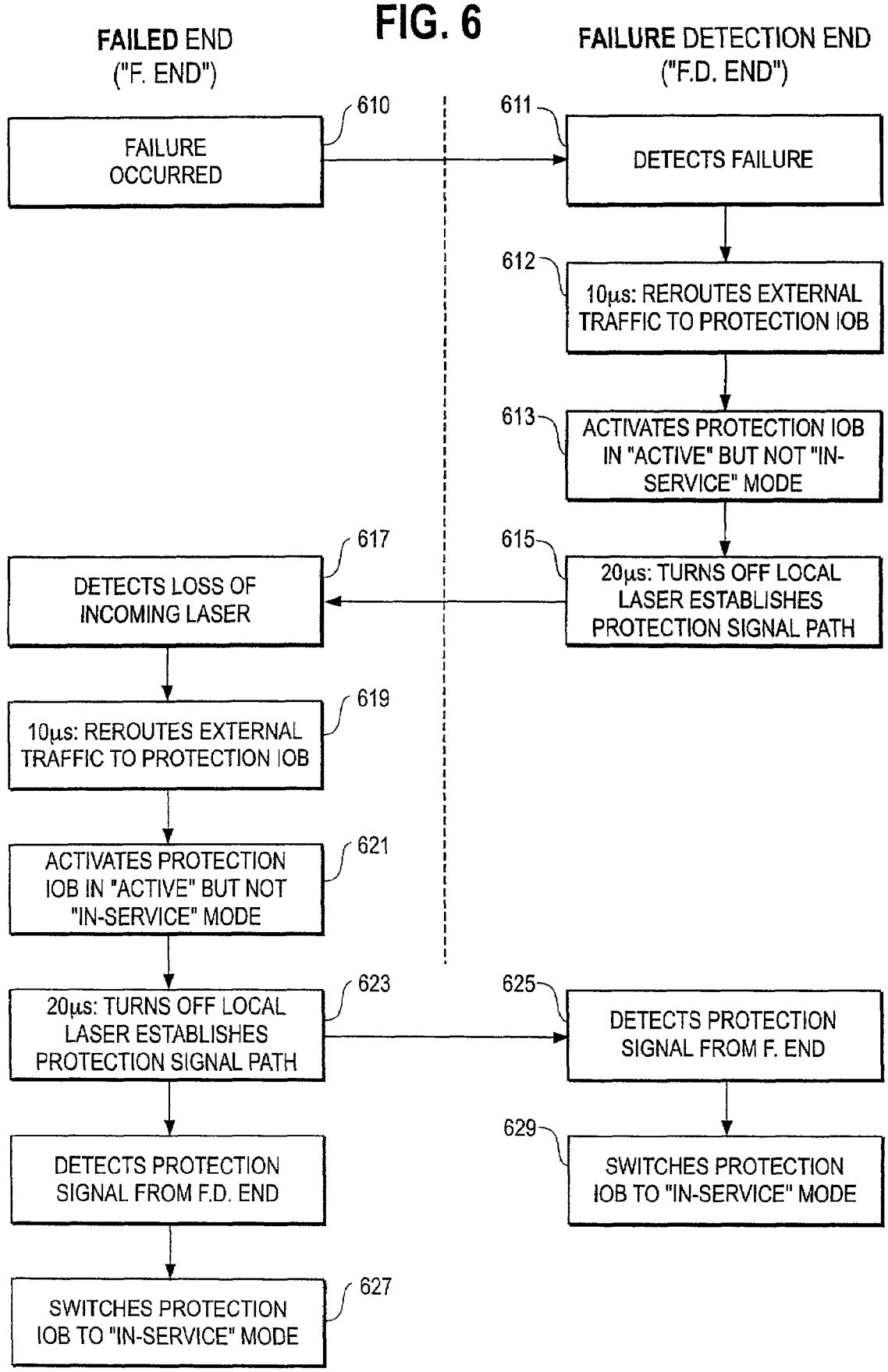
FIG. 6 is a block diagram illustrating one exemplary method responding to a failure at a node to enable a pair of transponders to automatically reestablish communications via a protection channel, pursuant to an embodiment of the current invention.
Figure 7A:
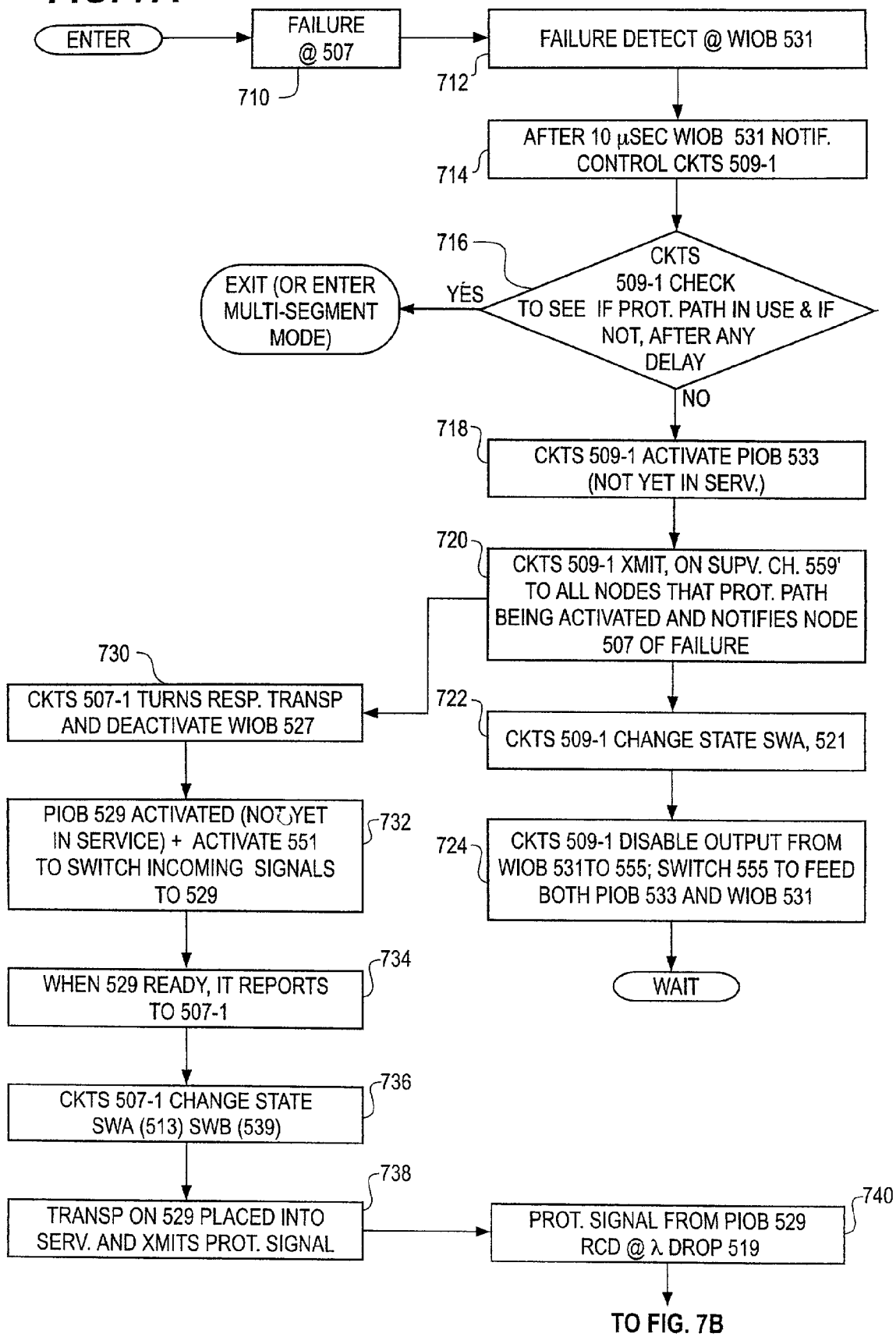
FIGS. 7A, B taken together are a block diagram illustrating another method of responding to a failure of one transponder to enable a pair of transponders to automatically reestablish communications via a protection channel, pursuant to an embodiment of the current invention.

For exemplary purposes, consider node 507 the "failed end"—i.e., the node where the failure occurs—and node 509 the "failure detection end." FIG. 6 is a flow diagram of one method of implementing an operating protection channel. FIGS. 7A, B taken together are a flow diagram of another method of implementing an operating protection channel. The process of FIG. 6 will be discussed first.

As illustrated in FIG. 6, with reference to FIG. 5 for exemplary purposes only, the triggering event for the sequence of events leading to establishment of the protection channel condition 610 is detection by WIOB 531, step 611, of failure detection end 509, for example, of a loss of light on the channel that had hitherto been received from failed end 507. In a preferred embodiment, when the loss of light has lasted for a certain period of time, step 612 (10 usec.) the the protection sequence is initiated. It will be understood that other failures will be responded to similarly.

In the embodiment depicted in FIG. 6, the exemplary period of time is 10 microseconds. It will also be understood that the invention can be practiced with time periods ranging from 1 microsecond to thousands of microseconds. As those of skill in the art will understand, the user of the invention needs to balance the need to be certain a loss of light has occurred (suggesting a longer period) against the need to avoid excessive loss of data while the protection sequence is implemented (suggesting a shorter period).

Returning to FIG. 5, communications traffic originating at external communications device 557 associated with failure detection end 509 is rerouted from WIOB 531 to PIOB 533 by operation of switch 555. At this point, in this embodiment, PIOB 533 is placed in the active mode, but not in the "in-service" mode. In this condition, PIOB 533 emits a data-less signal.

Because Switches A, B 521 and 547 are still in their normal settings, the signal from PIOB 533 is not sent into the network. Thus, in the active mode, PIOB 533 outputs a data-less signal on the protection channel wavelength, but, in FIG. 5, that signal is routed by switch 547 to an isolater.

During this time, communications from the external communications device 557 may be stored in memory for communication once the protection path is established, or, may simply be lost. Depending on the type of data, the loss may or may not be significant. Higher level protocols may be used, as are known in the art, to recover from data losses.

As those of skill in the art will understand, the steps of rerouting external traffic to the protection interface PIOB and activating that interface IOB in the "active" but not "in-service" mode can, but need not, occur substantially simultaneously. The protection channel is established by turning off the local laser on WIOB 531 and by changing the settings of switch 547 and switch 521. Alternate processing arrangements come within the spirit and scope of the invention.

The new switching arrangement provides a path for the data-less protection signal coming from PIOB 533, through switch 547 to multiplexer 525, and through the ring network to its final destination at the failed end 507. Also, as noted above, step 615, the laser associated with WIOB 531 is switched off. Switching off this laser not only turns off a component that is no longer needed (since the channel associated with that laser will be abandoned in favor of the protection channel), but also provides a signal back to the failed end 507, in the form of a loss of light from the failure detection end 509.

As just mentioned, WIOB 527 at the failed end detects a loss of light from the failure detection end. As yet, the switches in failed end 507 are not configured to permit the protection signal to pass through to PIOB 529. In the depicted embodiment, failed end WIOB 527 is substantially identical in operation to failure detection end WIOB 531, and thus responds to the loss of light in the same way.

Upon detection of loss of light for the specified period (10 microseconds in the depicted embodiment), step 619, communications traffic originating at external communications devices 553 associated with failed end 507 is rerouted from WIOB 527 to PIOB 529 by operation of switch 551. At this point, PIOB 529 is placed in the active mode, but not in the "in-service" mode. Thus, PIOB 529 outputs a data-less signal on the protection channel wavelength. In FIG. 5, that signal is routed by switch 539 to an isolater, step 623.

WIOB 527 at the failed end turns off its laser (which may have already been turned off as a result of the failure) for the failed channel. In addition, switches 539 and 513 are switched to establish the protection channel path within node 507.

The new switching configuration in node 507 provides a path for the protection signal coming into node 507 from node 509 to go through the Traffic Lambda Drop 511, through switch 513 to Lambda Protection Drop 537 and on to PIOB 529. This switching thus completes the path for the protection signal that originated at failure detection end 509, to the PIOB of failed end 507. Receipt of that protection signal causes PIOB 529 to switch to the in-service mode, and thus to begin transmitting data received from external devices 553 over the network, step 627.

The completion of the protection signal path from node 507 to node 509 by the switching of switch 539 has resulted in a protection signal being sent from PIOB 529 to PIOB 533.

IOB 533 has switched to the in-service mode, and thus can transmit data received from external devices 557 over the network. Thus, through the above-described series of steps, a a protection signal channel has been established between failed end 507 and failure detection end 509, and the PIOBs at both ends have been switched on to the in-service mode. This permits a resumption of communications between the two nodes, such that data that was originally send along the failed wavelength is now being transmitted along the protection wavelength. FIG. 5A illustrates an alternate node configuration for carring out the method of FIG.6.

FIG. 6 is a flow diagram that illustrates added details as to how two nodes that have experienced a communication breakdown can reestablish a communication between themselves automatically, over a protection channel. The left side of FIG. 6 depicts events that occur at the failed node, and the right side depicts events that occur at the failure detection node. Comparison of the two sides shows that each side reacted substantially the same way to a detected failure.

In the event of a transponder failure or other type of signal degradation at the failure detection end, the failure detection end 509 senses a loss of light or other symptoms of failure. Upon sensing the failure symptomology for an exemplary 10 microseconds, the failure detection end checks whether the virtual protection channel is already in use in the network. If it is, then the protection sequence is not initiated. If the protection channel has not been used, the protection sequence is initiated.

In an alternate embodiment, using the supervisory channel 559, 559', the control circuits, such as 509-1, can determine which portion of the protection channel is in service. If there is no overlap between the segment of the protection channel that is in service and the segment which now needs to be placed into service, both segments can be in service simultaneously.

By way of example, the failure detection end, node 509, determines whether a protection channel is in use or not in use based on a signal (or lack of a signal) from supervisory channel 559, depicted in FIG. 5. As those of skill will understand, supervisory channel 559 would be in communication with all the nodes of the network, and receives and sends information to and from the nodes regarding whether the protection channel is in use. Upon initiation of the protection sequence, supervisory channel 559 changes its state to indicate that the protection channel is in use. Thus, when the protection channel is already in use, the supervisory channel operates to prevent a second initiation of the protection sequence.

Hence, if a failure has been detected, for the exemplary 10 microseconds, and the protection channel is not in use, the failure detection end switches 555 and reroutes external traffic from device 557 to its protection IOB, step 612 and activates the protection IOB in the "active" but not "in-service" mode step 613.

When the failure has persisted for the exemplary 20 microseconds, the failure detection end turns off its local laser and switches, Switch A, 521 the appropriate switch to establish the protection signal path within that node, step 615. The action of turning off the local laser at the failure detection end results in the failed end detecting a loss of light from the failure detection end step 617.

Upon sensing the loss of light for 10 microseconds, the failed end reroutes external traffic via switch 551 to its protection IOB step 619 and activates the protection IOB 529 in the "active" but not "in-service" mode. When the loss of light has persisted for 20 microseconds, the the failed end turns off its local laser and switches the appropriate switches to establish the protection signal path within that node step 623.

Establishment of the protection signal path at both nodes, while both PIOBs are in the active mode, results in a data-less protection signal being received by each PIOB from the other PIOB steps 623, 625. Upon receipt of the protection signal, each PIOB switches to the in-service mode steps 627, 629, thereby enabling the resumption of communication between the two nodes.

Those of skill in the art will understand that a variety of steps could be implemented to carry out the above process without departing from the spirit and scope of the present invention.

FIG. 7A, B taken together are a flow diagram that illustrates how two nodes that have experienced a communication breakdown, reestablish communication between themselves automatically, using the protection channel. The left side of FIGS. 7A, B depict events that occur at the failed node. The right side depicts events that occur at the failure detection node.

In the event of a failure at the failed end, condition 710, the failure detection end 509 senses the failure, step 712. Upon sensing the failure for an exemplary 10 microseconds, step 714, the failure detection end checks whether the virtual protection channel is already in use in the network, step 716. If it is, then the protection sequence is terminated. If the protection channel has not been used, the protection sequence continues. Here too, in an alternate embodiment, two different, non-overlapping sections for the protection channel can be placed into service.

By way of example, the failure detection end, node 509, determines whether a protection channel is in use or not in use based on a signal (or lack of a signal) from incoming supervisory channel 559, depicted in FIG. 5. As those of skill will understand, supervisory channel 559 would be in communication with all the nodes of the network, and receives and sends information, output channel 559', from and to the nodes regarding whether the protection channel is in use. Upon initiation of the protection sequence, supervisory channel 559 changes its state to indicate that the protection channel is in use.

Thus, when the protection channel is already in use, in the single segment embodiment of FIG. 7A, the supervisory channel 559 operates to prevent a second initiation of the protection sequence. In an alternate embodiment, not illustrated, using module control circuits, such as 507-1, 509-1, a second, non-overlapping initiation of the protection sequence, using a different portion of the protection ring, could be implemented.

With reference to FIG. 7A, if the failure has been detected for the exemplary 10 microseconds, and the protection channel is not in use, in step 718, the transponder on the respective PIOB, such as PIOB 533 is activated by control circuits 509-1 but not placed in service. In step 720, the respective control circuitry, control circuits 509-1, transmits a message on out-going supervisory channel 559' to all other nodes in network 10 that the protection channel is being placed into service and informing the failed node, node 507, of the failure.

In step 722, the state of switch A, switch 521, is changed. Control circuits 509-1, for example, in step 724, disable the electrical output signals from the respective WIOB, such as WIOB 531, to switch 555. Switch 555 is also activated to feed incoming signals to both WIOB 531 and PIOB 533.

In step 730, control circuits at the failed node, circuits 507-1 deactivate the transponder at that node, WIOB 527. In step 732, the transponder on PIOB 529, is the respective PIOB, activate but not yet placed in service. Element 551 is switched to direct incoming signals from element 553 to PIOB 529 for transmission.

When PIOB 529 is ready, it so informs the respective control circuit, circuit 507-1, step 734. In response thereto, circuit 507-1 step 736, changes the state of switches A, B, switches 513, 539.

In step 738, the respective protection transponder on the PIOB, such as PIOB 529, is placed in service. An information carrying protection signal is coupled via switch B and multiplexer 517 to fiber 510.

The protection signal is received from fiber 510, from the failed node, node 507, condition 740. In step 742, the received protection signal, from the failed node, node 507, from PIOB 529 is coupled, via respective switch A, switch 521, and protection lambda drop, such as protection lambda drop filter 545, to the respective PIOB, such as PIOB 533.

In step 744, the failure detection node, node 509 and PIOB 533, verifies the presence of an "acceptable" signal on the protection path from the failed node 507 and notifies respective control circuits, circuits 509-1. In step 746, the respective control circuits disable WIOB 531, change the state of Switch B, switch 547, and place the respective transponder, PIOB 533, into service.

When PIOB 533 is placed into service, it transmits a signal on the protection channel switch B, switch 547, and respective multiplexer, such as 525, via fibers 510*a, b* to the failed node, node 507. In step 750, the protection channel lambda, is coupled via switch A, switch 513 and protection lambda drop 537, to the respective PIOB, PIOB 529, thus completing the process of placing the protection ring into service to carry traffic between nodes 507, 509. As noted above, variations of the process of FIGS. 7A, B come within the spirit and scope of the present invention.

FIG. 8 illustrates an embodiment of a portion of a network 200 for providing protection for a cut fiber. The network 200 includes nodes 507' and 509' which correspond structurally to and functionally to nodes 507, 509 previously discussed.

To provide cable cut protection; fiber 510 can be coupled to splitter 204. The split optical signal can be coupled to a working fiber 510-1 and a protection fiber 510-2. Splitter 204 would normally be at or near node 507'.

At the receiving end, at or near node 509', a switch 206 and an associated controller select, for example working fiber 510-1 during normal operation. Signals from that fiber are coupled to the optical input for node 509' via fiber 510-3. If the controller for switch 206 detects a loss of all signals from fiber 510-1 it changes the state of switch 206 and feeds signals from protection filer 510-2 to node 509'.

FIG. 5A illustrates an alternate embodiment to the add/drop multiplexers of FIG. 5. Elements of FIG. 5A which are the same as the corresponding elements of FIG. 5 have been identified using the same numerals.

In FIG. 5A, the protection lambda drops 537, 545 (of FIG. 5) have been deleted. The traffic lambda drops 511', 519' now always drop the protection lambda. The dropped protection lambda is directed, via Switch A', 513', 521' to combiner 515, 523 unless there is a failure at node 507'.

In the event of a failure at node 507', the nodes 507', 509' carry out a failure recovery process as in FIGS. 7A, B. As part of this process, Switches A' 513' and 521' change state and the dropped lambda is fed to PIOB 529 or 533. The add/drop multiplexers of FIG. 5A should provide a more cost effective implementation than the configuration of FIG. 5. It will be understood that other variations are possible and come within the spirit and scope of the invention.

While various embodiments of the present invention have been described above, it should be understood that they have been presented by way of example only, to describe the best mode of practicing the invention, and not limitation. Accordingly, the breadth and scope of the present invention should not be limited to any of the above-described exemplary embodiments, but should be defined only in accordance with the following claims and their equivalents.

What is claimed is:

1. A multi-node optical network comprising:
   a plurality of spaced apart nodes;
   a plurality of working communication paths, the members of the plurality extend between and carry traffic in a selected direction between selected nodes;
   a normally unused predetermined protection communication path that extends between all of the nodes forming a closed ring, the protection path is available to carry traffic in the selected direction, as needed at least between pairs of nodes in response to a failure of any one of the working paths between a respective pair of nodes;
   substantially identical activation circuitry at each node, the activation circuitry at each node of a selected pair of nodes detects a signal loss indicative of the failure of one of the working paths therebetween, each activation circuitry communicates with the other via the protection path to place that portion of the protection path between the selected pair of nodes into service in response to failure of any one of the working paths therebetween where the activation circuitry at a receiving node of the selected pair of nodes, in response to a loss of light on a working path from the transmitting node of the selected pair of nodes, terminates transmission on the respective working path and initiates a first dataless transmission via the protection path to the transmitting node, where the activation circuitry at the transmitting node, in response to a loss of light on the working path from the receiving node, terminates transmission on the respective working path and initiates a second dataless transmission, via the protection path, to the receiving node, the activation circuitry switches at least the second dataless transmission to traffic carrying between the nodes, and where the remaining members of the plurality of working paths continue to carry traffic in the selected direction.

2. A network as in claim 1 where the activation circuitry at each node responds to both a loss of light on the respective traffic carrying path and the presence of a received non-traffic carrying signal on the protection path.

3. A network as in claim 1 where the activation circuitry at each node includes an optical element for separating protection path signals from working path signals.

4. A network as in claim 3 which includes a plurality of light emitting elements associated with respective working paths and a protection path light emitting element for transmitting traffic on the protection path, in the event of a failure of one member of the plurality of light emitting elements.

5. A network as in claim 3 which includes an optical switch with an input coupled to an output of the protection path light emitting element, the switch has a control input to switch a protection path signal from within the activation circuitry to the protection path for transmission to a receiving node.

6. A network as in claim 5 where the activation circuitry at each node includes control circuitry to initially transmit as the protection path signal a dataless signal on the protection path and to subsequently transmit a traffic carrying signal on that path.

7. A network as in claim 6 where the control circuitry responds to receipt of a non-traffic carrying signal on the protection path from another node to transmit a traffic carrying signal on the protection path.

8. A network as in claim 7 which includes a traffic add/drop switch which couples incoming traffic to one of the members of the plurality of light emitting elements or to the light emitting element of the protection path in the event of a failure of one of the working paths.

9. A multi-node optical network comprising:

a normally inactive, singular, looped protection communication path which includes a plurality of network nodes;

at least one working communication path for communicating traffic in a first direction between receiving and transmitting nodes;

substantially identical receiving and transmitting modules located in respective receiving and transmitting nodes of the network with each module incorporating first and second monochromatic sources of light, one source is associated with the working path, the other is associated with the protection path, and at least one detector of monochromatic light received from the working path;

control circuitry in each module coupled to the respective detector and sources, the control circuitry at the receiving node is responsive to a loss detected thereat, of monochromatic light on at least a portion of the working communication path where the light originated at the transmitting node, and the control circuitry at the receiving node in response to locally detected loss of light initiates a multi-step switching process to transfer traffic on at least a portion of the working communication path between nodes to at least a portion of the protection path between the nodes, the control circuitry at the receiving node transmitting a selected dataless control signal via the looped protection path to the transmitting node, and the control circuitry at the transmitting node subsequently transferring traffic from the failed portion of the path, between the receiving and transmitting nodes to the portion of the protection path therebetween for communicating the traffic from the failed path via the protection path in the first direction, where the control circuitry at the transmitting node responsive, to at least in part, to a loss detected thereat, of monochromatic light on another portion of the working communication path, where the light originated at the receiving node, transmits a second selected dataless control signal to the receiving node via that portion of the protection path therebetween with at least the control circuitry at the transmitting node switching the dataless signal on the protection path between the receiving and transmitting nodes to a traffic carrying signal.

10. A multi-node optical network comprising:

a normally inactive, singular, looped protection communication path which includes a plurality of network nodes;

at least one working communication path for communicating traffic in a first direction between first and second nodes;

first and second substantially identical modules located in respective first and second nodes of the network with each module incorporating first and second monochromatic sources of light, one source is associated with the working path, the other is associated with the protection path, and at least one detector of monochromatic light received from the working path; control circuitry in each module coupled to the respective detector and sources, the control circuitry at the first node is responsive to a detected loss of monochromatic light on at least a portion of the working communication path where the light originated at the second node, and the control circuitry at the first node in response to the detected loss of light initiates a multi-step switching process to transfer traffic on at least a portion of the working communication path between nodes to at least a portion of the protection path between the nodes, the control circuitry at the first node transmitting a selected dataless control signal via the looped protection path to the second node, and the control circuitry at the second node subsequently transferring traffic from the failed portion of the path, between the first and second nodes to the portion of the protection path therebetween for communicating the traffic from the failed path via the protection path in the first direction, where the modules each include first and second optical switches, the first switch couples the protection path signal to the control circuits, the second switch has an input coupled to an output from the source of light associated with the protection path for switching the protection path signal from a protection path non-transmitting state to a protection path transmitting state, both switches have control inputs coupled to the control circuits, the control circuits being responsive to a received dataless control signal to switch the signal being transmitted on the protection path to a traffic carrying signal.

* * * * *

UNITED STATES PATENT AND TRADEMARK OFFICE
CERTIFICATE OF CORRECTION

PATENT NO. : 7,272,307 B2  Page 1 of 1
APPLICATION NO. : 10/154422
DATED : September 18, 2007
INVENTOR(S) : Rong C. Fang It is certified that error appears in the above-identified patent and that said Letters Patent is hereby corrected as shown below:

Column 1, Line 11: Insert a period after "networks"
Column 3, Line 27: Remove the second instance of "channel" and replace with --channels--
Column 5, Line 9: Remove the word "the"
Column 6, Line 64: Remove the word "send" and replace with --sent--
Column 9, Line 42: Remove the word "filer" and replace with --fiber--
Column 12, Line 40: Remove the word "protcction" and replace with --protection--

Signed and Sealed this

Eighteenth Day of December, 2007

JON W. DUDAS
*Director of the United States Patent and Trademark Office*